United States Patent

[11] 3,599,479

| [72] | Inventor | Ali Umit Kutsay<br>3520 Lewis Road, Newton Square, Pa. 19073 |
|---|---|---|
| [21] | Appl. No. | 828,873 |
| [22] | Filed | May 29, 1969 |
| [45] | Patented | Aug. 17, 1971 |

[54] STRAIN GAGE
8 Claims, 9 Drawing Figs.

[52] U.S. Cl. .................................................. 73/88.5 R, 338/6, 73/141 A
[51] Int. Cl. ..................................................... G01b 7/18
[50] Field of Search ........................................... 73/88.5, 141; 338/2, 5, 6

[56] References Cited
UNITED STATES PATENTS

| 2,722,587 | 11/1955 | Buzzetti et al. | 73/88.5 X |
| 3,033,034 | 5/1962 | Ziggel | 73/141 |
| 3,035,240 | 5/1962 | Starr | 73/88.5 X |
| 3,444,499 | 5/1969 | Lovelace | 73/88.5 X |

*Primary Examiner*—Charles A. Ruehl
*Attorney*—Eugene E. Geoffrey, Jr.

ABSTRACT: The probe unit includes a small central gaging beam portion, spaced end blocks adapted to be bolted or otherwise clamped to the structure to be tested, and hinge plate portions connecting the blocks to the central portion in planes offset from the axis of the gaging beam. The hinge plates are relatively thin, and hence flexible, in the direction of the clamping attachment pressures, relieving the gaging beam of and significant initial bending stress in case of misalignment of the attaching surfaces. Electrical strain gages are bonded to the beam, preferably internally, in respectively outwardly and inwardly spaced relation to the beam's axis in the direction of the latter's offset from the plane of the connecting plates. Changes in strain of the tested member between the attachment blocks are transmitted via the blocks and plates to the offset gaging beam, causing the beam to bend, thus unbalancing the resistances of the strain gages. The imbalance is detected by calibrated means, giving a measure of the stress in the tested structure.

INVENTOR
ALI UMIT KUTSAY

PATENTED AUG 17 1971 3,599,479

INVENTOR
ALI UMIT KUTSAY
BY Eugene Hoffly
ATTORNEY

STRAIN GAGE

Determinations of stresses and strains in various structures become necessary or highly desirable when the structures are already in use and when the nature of the structures renders analytical and/or laboratory simulation inadequate. The need for such measurements becomes even more urgent when dynamic or transient stresses are involved. In the cases of large structures such as heavy presses, cranes, bridges and the like, practical considerations require that the installation of gaging equipment be accomplished in the field. One method of carrying out such an installation, as attempted hitherto, has been to bond conventional strain gages directly to the structural member at the location or locations deemed critical in case of possible overload conditions. This procedure has presented several practical difficulties. Surface preparation, cleanliness, pressure and heat application are involved, and these factors obviously cannot be properly controlled in the majority of operating field situations. Similarly, calibration of the strain gages after installation is substantially impossible in most cases, except indirectly through prior assumptions based on general material and strain gage properties, a method of obviously questionable reliability.

In addition to the above difficulties, since economic factors dictate that large component members be formed of cheap and comparatively low unit strength materials, and hence of massive construction, the actual amount of strain movement available within the limited effective length of a directly attached strain gage is likely to be too small for significantly accurate measurement. To overcome the latter basic problem, an approach has been to increase the overall range on the structural element under test to several times the length of the detecting gages themselves, while concentrating the strain effect within the direct operative zone of the gages.

To accomplish the above mentioned concentration, auxiliary mounting devices have been evolved, typically in the form of a generally rectangular bar having end portions to be rigidly attached to the member under test, and a reduced middle portion or gaging beam to which the strain gages are bonded. In one type the reduced middle portion is laterally offset from the line in which the primary stress occurs between the end attachments, so that the strain effect on the middle portion is that of bending rather than straight tensional or compressional strain; with proper gage application such an arrangement is theoretically capable of producing gage outputs several times greater than those attainable with straight line gaging under the dame over all stress conditions.

However, attempts to utilize the above principle to the best advantage have hitherto been handicapped by certain factors inherent in the form of gage mountings employed, a principal such factor being relatively high rigidity in the structures through which stresses are to be transmitted from the fastenings to the central gaging portion. In the case of probing units to be field installed on large members, this rigidity, particularly in the direction of the clamping pressures, has often rendered direct attachment impractical, due to characteristic lack of exact surface alignment between available adjacent attachment areas on the large members themselves and the bolting pressures necessary for secure attachment to such misaligned surface areas have produced relatively heavy extraneous bending stresses in the gaging portion of the fixture which impair of not destroy the accuracy of any precalibration. In addition to the above, difficulty has resulted from the practice of locating the strain gages on the exterior of the gaging beam, rendering them vulnerable not only to direct physical injury, but also to damage through deterioration and possible failure of their protective coatings due to age and atmospheric conditions, the latter danger being obviously most pronounced in the case of outdoor applications.

In view of the above and related factors, an object of the present invention is to provide a strain-gaging unit which is insensitive to attachment pressures and consequent local distortions.

Another object is to provide a strain probing unit adapted to produce maximum indicating effect in proportion to the strain in the structure under test.

A further object is to provide a gaging unit which is adapted to be precalibrated and which can be readily applied in the field while retaining the accuracy of its calibration.

A still further object is to provide a strain-probing device adapted to convert linear strain between spaced attaching portions into bending strain in a hollow intermediate beam, and in which electrical strain gage units are bonded to the interior of the beam.

Another object is to provide a strain gage which is light, rugged, and adapted to apply the maximum portion of linear stress to useful bending moment in the gaging beam.

Additional advantages of the invention will become evident during the course of the following description in connection with the accompanying drawings, in which FIG. 1 is a plan view of a preferred form of the device;

Figure 5:
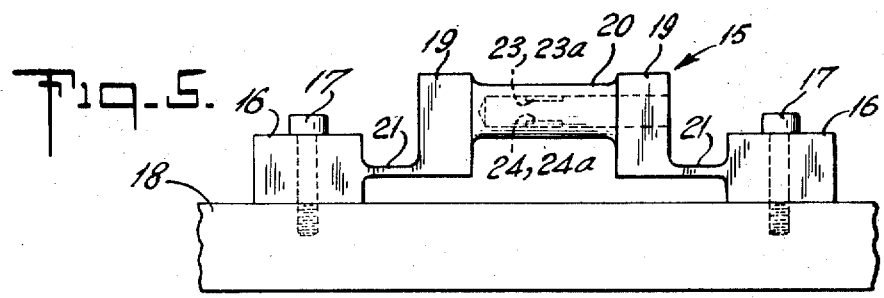
Figure 6:
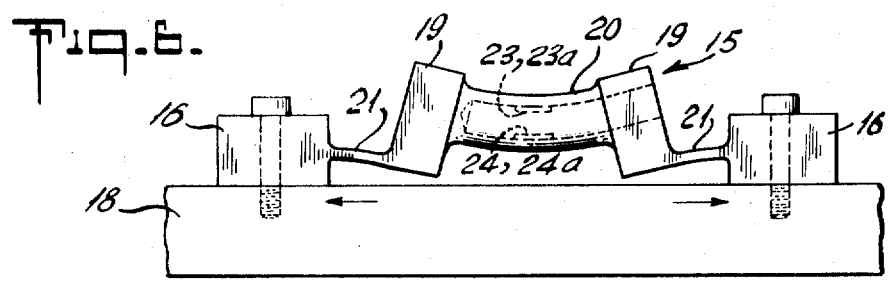
Figure 7:
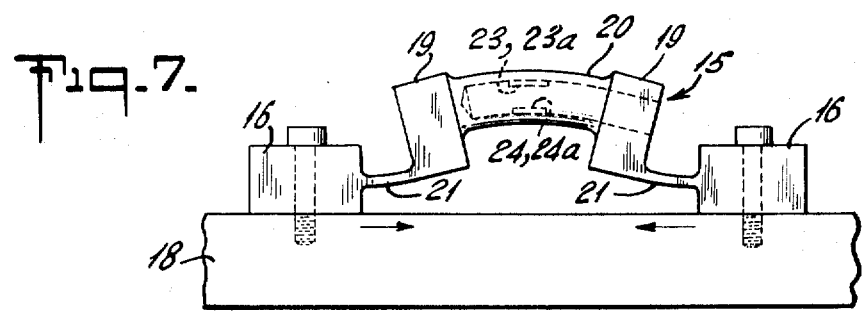
Figure 8:
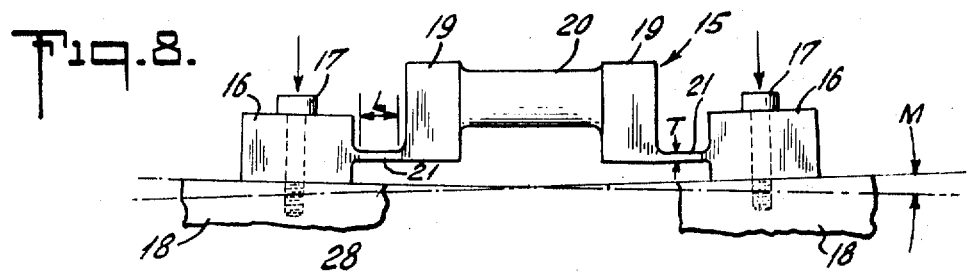
Figure 9:
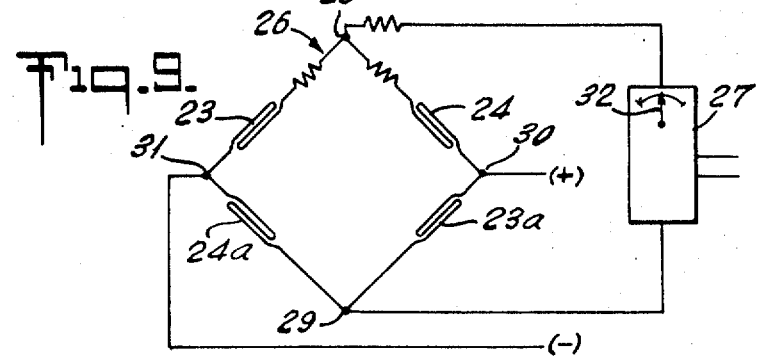

FIGS. 5, 6, and 7 are diagrammatic views illustrating the operation of the device, the dimensional and motional relationships being exaggerated for clarity in explanation;

FIG. 8 is a similar diagram illustrating the insensitivity of the device to misaligned attaching pressures; and FIG. 9 illustrates a typical bridge circuit for use with the electrical strain gage elements.

Figure 1:
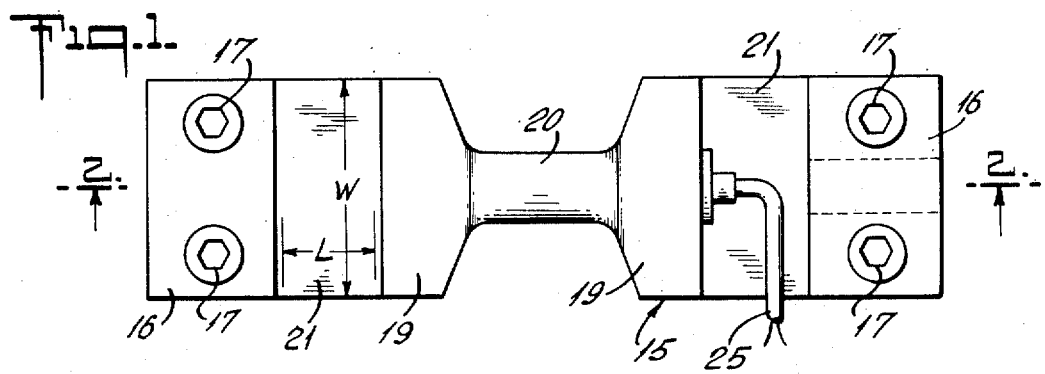
Figure 2:
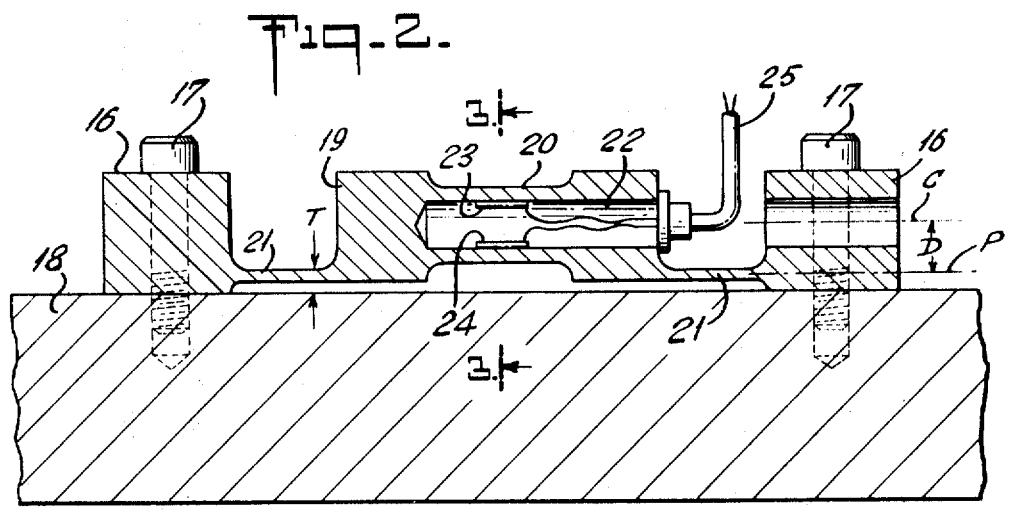
FIG. 2 is a longitudinal vertical section of the same in the plane 2—2, FIG. 1.
Figure 3:
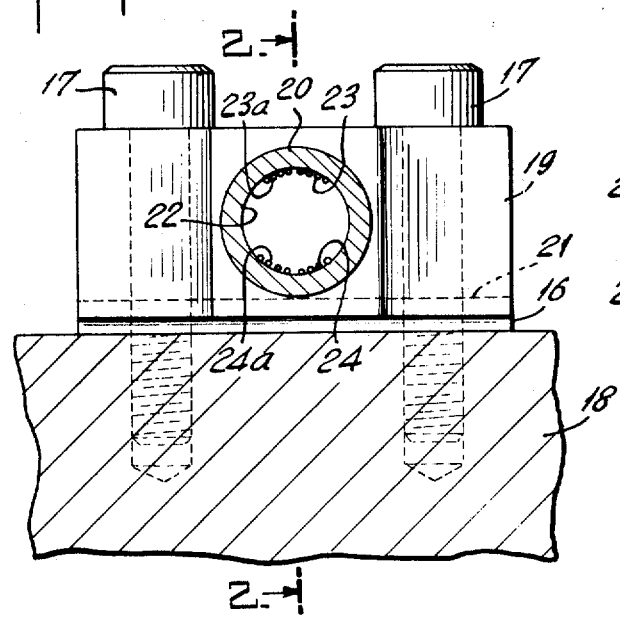
FIG. 3 is an enlarged vertical cross section in the plane 3—3, FIG. 2.

Referring to FIGS. 1 and 2, the numeral 15 generally denotes an improved strain gaging probe which is illustrated as of one-piece construction throughout, though obviously it may if desired be built of components suitably joined by welding, brazing, etc. The ends of the typical probe comprise blocks 16 adapted to be clamped by bolts or cap screws 17 to a member 18 which is to be tested. Spaced midway between the blocks 16 is a strain-converting structure comprising relatively rigid crossbars or members 19 joined by a central gaging beam 20 of reduced section and preferably hollow form, as shown in FIGS. 2 and 3. The bars 19 are connected to the attaching blocks 16 by flat plate portions 21. These plates, as shown in FIG. 2 are relatively thin in the direction of the clamping pressures supplied by the bolts 17; their small thickness T, and their substantial effective spans L between the blocks 16 and bars 19 provide the plates with a correspondingly high degree of flexibility in the said clamping direction. However, due to their comparatively large width W, as shown in FIG. 1, the plates 21 have ample cross-sectional areas to permit them to carry the longitudinal stresses which they are required to transmit, as hereinafter set forth.

The general plane P of plates 21 is offset by a distance D from the center line C of the gaging beam 20, FIG. 2. While obviously the device may be mounted in any operational position, for convenience in description the directional relationships will be defined typically as those appearing in FIG. 2 thus for example the plane P of the plates 21 may be defined as offset downwardly from the beams axis C. The interior surface or bore 22 of the beam 20 has bonded to its upper and lower longitudinal zones two electrical filament strain gages 23 and 24, respectively. In the preferred form of the device, as shown in FIG. 3, additional matching gages 23a and 24a are bonded to the upper and lower bore surfaces closely alongside the respective gages 23 and 24. The gages may be bonded to the bore surfaces by any suitable means, such for example as that disclosed in my U.S. Pat. No. 2,873,341. With respect to the above patent, it will be observed that the arrangement of gage filaments renders them operationally responsive to straight linear strain but insensitive to bending.

As pointed out above, the plane P is offset from the center line C by a distance D which of course may be varied over relatively wide limits. However, it is preferable that the ratio of D to the radius of gyration of the area of the beam 20 be approximately equal to 1 for maximum sensitivity.

Exterior electrical connections with the various gages 23, 24, etc., may be provided through a multiconductor cable 25, FIGS. 1 and 2. FIG. 9 shows a typical full bridge circuit 26 for inclusion of the gages to the best advantage, the numeral 27 denoting any desired instrumental combination employing the output from the bridge.

It is well known in the art that the actual physical movements and relative changes involved in the type of testing dealt with herein are normally too minute for any direct practical showing on the patent sheet; hence the diagrammatically exaggerated showings in FIGS. 5, 6, 7, and 8 will be employed for clarity in explanation.

Referring to FIG. 5, which shows the fixture 15 initially installed on the member 18 to be tested, the gaging beam 20 is not under any significant stress or resultant strain, so that its bonded gages 23, 24, etc., are in the mutually balancing condition set up in their prior calibration. When as illustrated in FIG. 6, the member 18 is subjected to linear load which causes an increase or strain in its length between the attaching blocks 16, a tensional stress is generated in the fixture 15. This stress is transmitted from the blocks 16 via the plates 21 to the cross bars 19, thence to the gaging beam 20. Due to the previously noted offset of the beam from the plates 21 on the bars 19, the originally rectilinear stress is converted largely into bending stress in the beam 20. This bending moment flexes the beam in a downwardly convex arc, the plates 21 acting as straps which yield downwardly to permit maximum bending strain in the beam. The curvature of the beam in turn affects the strain gages bonded therein, expanding the lower gages 24, 24a, while contracting the upper gages 23, 23a, and thereby changing the resistance values of the respective gages in the manner characteristic of such units. The result is an operation disparity in resistances between the lower and upper pairs of gages, which proportional imbalance is utilized to detect the extent of strain in the tested member 18, as hereinafter set forth.

Similarly, referring to FIG. 7, when stress in the tested member 18 produces a contraction therein between the attachment blocks 16, the resulting compressive stress is transmitted from the blocks via the plates 21 and bars 19 to the offset gaging beam 20, causing the latter to arch or bend in an upwardly convex arc; the result is a contraction of the lower strain gages 24, 24a, and an expansion of the gages 23, 23a, producing a resistance value imbalance between the respective lower and upper gage units which is the inverse of that produced by the expansion of the member 18 as illustrated in FIG. 6. In considering the compressional operation as diagrammed in FIG. 7, it is appropriate to recall that while the bending required of plates 21 are relatively thin, in actuality the bending required of them is too small to produce any tendency toward buckling which could reduce their effectiveness as columns transmitting the compressive stress.

Due to the characteristic geometry involved in the processes described above, it will be evident that the useful gaging effects produced thereby are much greater than could result from any practical bonding of gages directly to the number 18, the advantage arising not only from actual amplification of strain as applied to the individual gages, but also to the face that a strain of the tested member 18 in either single direction results simultaneously in both expansional and compressional resistance changes within the gage group, i.e., a differential effect. To detect and utilize the changes, the various gages may be connected in the order shown in the typical bridge circuit, FIG. 9. Since the operation of bridge circuits per se is well known, the description herein will be confined to a brief explanation dealing with the gages employed in the present invention.

Referring to FIG. 9, the gages 23 and 24 are included respectively in the upper two legs of the bridge, namely, those connected to one output terminal 28 of the circuit. Similarly, the gages 23a and 24a are included in the lower legs of the bridge connected to the second output terminal 29, their locations in the bridge being in the legs opposite those of their respective companion gages 23 and 24. When the gaging beam 20 is unflexed, as in FIG. 5, the calibrated resistances in the legs of the bridge are in balance, so that a voltage applied through the input terminals 30 and 31 produces no difference in potential between the output terminals 28 and 29, hence no signal to the instrument combination 27. However, when the beam 20 is bent in either of the directions illustrated in FIGS. 6 and 7, changes in the resistances of the upper and lower pairs of gages unbalance the bridge circuit 25, causing a potential change in one direction or the other through the detecting instrument combination 27. This effect, which represents a measure of the originating strain in the tested member 18, may be utilized to actuate any desired apparatus appropriate to the particular installation, such as a simple indicating meter 32, a recording meter, or an automatic cutoff for use in case of dangerous overload in a machine under probing test.

In addition to the described bending of the gage beam 20, the latter is subjected to a relatively small amount of rectilinear strain, but as this affects all the strain gages equally, the results cancel each other out and hence have no effect on the accurate functioning of the calibrated bridge circuit as described.

The provision of the connecting plates 21 serves two principal functions in the improved applicability and efficiency of the present invention. One of these functions is the fact that they render the gage beam insensitive to extraneous stresses arising from lack of completely accurate alignment between the two attachment areas of the tested member. This point is illustrated in FIG. 8, in which the blocks 16 are bolted to surface portions of the tested member 18 misaligned at the angle M. In such a situation, the pressures exerted by the bolts 17 to assure firm attachment necessarily force the blocks 16 into similar angular misalignment, thus imposing a bending stress of the fixture 15 as a whole. If such stress were to be applied more or less equally throughout the active length of the fixture, as in certain devices previously mentioned as embodying relatively high stiffness in the direction of the attaching pressures, the obvious result would be a significant bending strain in the central gaging zone which would impair the accuracy of any precalibration. In the present invention, the small thickness T of the connecting plates 21 and their substantial effective lengths or spans L cause the plates to function as rectangular flat springs having high flexibility in the directions of the attaching pressures exerted by the bolts 17, i.e., the plates follow the well-known laws of such springs which define their flexibility as inversely proportional to the cube of their thickness and directly proportional to the cube of their length. Thus, the proportional amount of direct bending stress from attachment pressures which can be transmitted through the plates 21 to the central gaging section is so small as to be operationally negligible, so that the beam 20 and its gage units are rendered insensitive to these pressures; in other words, the beam 20 and its gages sustain no significant initial strain, with the result that the accuracy of precalibration remains unimpaired even when the device is mounted on surfaces considerably misaligned as illustrated diagrammatically in FIG. 8. The flexibility of the plates 21 similarly isolates the central gaging section from significant torsional effects due to possible transverse angular misalignment between the attaching surfaces. The advantages of the above improved qualities will be evident, a typical example being the elimination in most cases of special attaching surface preparation such as the jig welding of separate mounting pads to the member to be tested.

A second prime advantage of the flexible connecting plates 21 is that they reduce the overall longitudinal stress necessary to produce the desired bending of the gaging beam. This is due to the fact that converting the initial longitudinal strain to bending in the beam requires hinge effects between the end attachments and the beam structure, i.e., to bend the beam the hinges must also be bent. Thus the over all stress between the end attachments must include the energy necessary to bend the beam itself plus the energy necessary to bend the hinges.

When, as in some devices of this general nature, the entire angular hinge bending effects are confined to very narrow zones of minimum bending radius, the energy required to produce the sharply localized bendings constitutes a large addition to that needed to bend the gage beam. The additional stress of course is required of the attachment mountings, which latter must be proportionately massive.

In the present invention, however, the hinge-bending effects are distributed throughout the relatively long spans of the thin plates 21 at large bending radii. Since, in converse accordance with the previously noted laws of rectangular flat springs, the force necessary to flex such plates is inversely proportional to the cubes of their lengths, the "hinge" force required in the present device is so small in proportion to the linear stress directly employed to bend the beam 20 as to constitute a practically negligible addition thereto; this reduction in required overall stress between the end mountings allows the latter to be constructed for maximum lightness and ease of attachments. Another corollary advantage of the low ratio of hinge effect energy to beam bending energy lies in the fact that it permits the beam 20 itself to be of relatively light hollow construction as shown, with the further benefit of protected interior location of the strain gage units.

Figure 4:
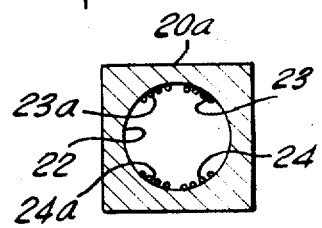
FIG. 4 shows a cross section of an alternative form of gaging beam.

From the foregoing it will be evident that the invention provides an improved strain probe which is light, rugged, sensitive, and adapted to easy attachment without loss of prior calibration. Obviously, structural details may be altered to meet particular manufacturing and applicational requirements. For examples, the gage beam may be of rectangular outer contour as shown at 20a, FIG. 4; the end blocks 16 may be formed as saddles or as halves of clamps for attachment to cylindrical members such as tie rods or stanchions; for some applications wherein the strains to be measured are so large as not to require maximum sensitivity in the probe, a single pair of cooperative strain gages connected in half bridge circuit may be employed. Thus, while the device has been set forth in preferred form, it is not limited to the exact embodiments illustrated, as various modifications may be made while not departing from the spirit of the invention within the scope of the appended claims.

I claim:

1. In probing apparatus for gaging linear strains between spaced zones of a structural member, in combination, an elongated fixture having end portions adapted to be secured by clamping forces to attachment surfaces on said spaced zones, an intermediate gaging portion including a plurality of electrical strain gages operationally responsive in the direction of said linear strains, and relatively thin plates connecting said end portions to said gaging portion to transmit said linear strains from said end portions to said gaging portion, the last said connecting plates isolating said gaging portion from significant strains incident to misalignment of said attachment surfaces, said plates being disposed in a plane lying below the upper surface of the gaging portion.

2. Apparatus according to claim 1 wherein said gaging portion includes crossmembers attached to said plates, and a gaging beam connecting said crossmembers and carrying said plurality of electrical strain gages, the longitudinal axis of said beam being offset at a predetermined distance from the planes of attachment of said plates to said cross members, whereby longitudinal stress transmitted through said plates is converted to a bending moment in said gaging beam.

3. Apparatus according to claim 1 wherein said connecting plates have a high degree of flexibility in the directions of said clamping forces relative to the flexibility of said gaging portion in said directions.

4. Apparatus according to claim 3 wherein said gaging portion includes crossmembers attached to said plates, and a gaging beam connecting said crossmembers and carrying said plurality of electrical strain gages, the longitudinal axis of said beam being offset at a predetermined distance from the planes of attachment of said plates to said crossmembers, whereby longitudinal stress transmitted through said plates is converted to a bending moment in said gaging beam.

5. Apparatus according to claim 4 wherein said gaging beam is hollow, and wherein said plurality of electrical strain gages are arranged in sets and said sets of gages are secured to the interior of said beam.

6. Apparatus according to claim 5 wherein said hollow beam is of circular cross section.

7. Apparatus according to claim 4 wherein the transverse exterior dimension of said gaging beam is substantially smaller than the widths of said hinge plates.

8. In probing apparatus for gaging linear strains between spaced points of a structural member, an elongated strain detecting probe of resilient material disposed substantially parallel to said structural member, at least two resilient supporting means connecting the ends of said probe to adjoining portions of said structural member, said supporting means being spaced from the centerline of said probe in the direction of said structural member by a distance D, the ratio of said distance D and the radius of gyration of the area of said probe being approximately 1 and strain gages carried by said probe.